United States Patent
Platko et al.

(10) Patent No.: US 6,363,444 B1
(45) Date of Patent: *Mar. 26, 2002

(54) SLAVE PROCESSOR TO SLAVE MEMORY DATA TRANSFER WITH MASTER PROCESSOR WRITING ADDRESS TO SLAVE MEMORY AND PROVIDING CONTROL INPUT TO SLAVE PROCESSOR AND SLAVE MEMORY

(75) Inventors: John J. Platko, Acton; Robert Reissfelder, Westwood, both of MA (US); Glenn Connery, Sunnyvale, CA (US)

(73) Assignee: 3COM Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/464,626

(22) Filed: Dec. 17, 1999

Related U.S. Application Data

(60) Provisional application No. 60/143,869, filed on Jul. 15, 1999.

(51) Int. Cl.$^7$ .......................... G06F 13/00; G06F 13/28; G06F 13/38; G06F 13/40; G06F 15/00

(52) U.S. Cl. .............................. 710/110; 710/1; 710/22; 710/128; 709/208; 712/33; 712/34; 712/35; 712/36; 712/200; 712/225

(58) Field of Search ................................. 709/200, 208, 709/211, 212; 710/1, 3, 4, 5, 7, 20, 21, 22, 26, 27, 29, 31, 38, 65, 110, 128; 711/1; 712/32, 33, 34, 35, 36, 38, 42, 200, 201, 225

(56) References Cited

U.S. PATENT DOCUMENTS

| | | | | |
|---|---|---|---|---|
| 4,368,514 A | * | 1/1983 | Persaud et al. | 364/200 |
| 4,785,415 A | * | 11/1988 | Karlquist | 364/900 |
| 4,853,847 A | * | 8/1989 | Ohuchi | 364/200 |
| 4,876,643 A | * | 10/1989 | McNeill et al. | 364/200 |
| 5,193,159 A | * | 3/1993 | Hashimoto et al. | 395/375 |
| 5,265,201 A | * | 11/1993 | Cabot et al. | 395/163 |
| 5,524,265 A | * | 6/1996 | Balmer et al. | 395/800 |
| 5,598,579 A | * | 1/1997 | Welker et al. | 395/842 |
| 5,606,666 A | * | 2/1997 | Grant et al. | 395/200.08 |
| 5,710,939 A | * | 1/1998 | Ballachino et al. | 395/821 |
| 5,752,068 A | * | 5/1998 | Gilbert | 395/800.16 |
| 6,078,665 A | * | 6/2000 | Anderson et al. | 380/28 |

* cited by examiner

*Primary Examiner*—Thomas C. Lee
*Assistant Examiner*—Tanh Nguyen
(74) *Attorney, Agent, or Firm*—Weingarten, Schurgin, Gagnebin & Lebovici LLP

(57) ABSTRACT

A master processor, such as a processor embedded in a network interface card, is coupled to a memory via a memory data bus. The master processor generates addresses for the memory and controls the reading and writing of the memory at addressed locations. A slave processor, such as an optional encryption engine, has a data input/output bus connected to the memory data bus. The master processor also controls the reading and writing of data to/from the slave processor via the memory data bus. The master processor effects data transfers from the memory to the slave processor over the data bus by generating a series of memory addresses to read the data from the memory onto the data bus. As each data word appears on the data bus, it is written into the slave processor. The master processor effects data transfers from the slave processor to the memory over the data bus by reading a series of data from the slave processor onto the data bus, generating a series of memory addresses as the data are being read from the slave processor, and writing each data word into the memory as it appears on the data bus.

14 Claims, 4 Drawing Sheets

READY = word written and ready to be processed
BUSY  = word read into encryption processor
DONE  = word completed and result returned (if required)

SLAVE PROCESSOR TO SLAVE MEMORY DATA TRANSFER WITH MASTER PROCESSOR WRITING ADDRESS TO SLAVE MEMORY AND PROVIDING CONTROL INPUT TO SLAVE PROCESSOR AND SLAVE MEMORY

CROSS REFERENCE TO RELATED APPLICATIONS

This application claims the benefit under 35 U.S.C. §119 (e) of provisional patent application No. 60/143,869, filed Jul. 15, 1999 and entitled "ATTIC Bus—An Efficient Co-Processor/SSRAM Interface."

STATEMENT REGARDING FEDERALLY SPONSORED RESEARCH OR DEVELOPMENT

Not Applicable

BACKGROUND OF THE INVENTION

The invention is related to the field of processing systems, and more particularly to the transfer of data among different processing elements within a processing system.

Processing systems require communication mechanisms among elements. An example of a specialized processing system having need for a communication mechanism is a network interface card (NIC) of the type used in host systems such as personal computers and workstations. NICs are generally plug-in circuit cards having an interface to an I/O bus used in the host system, along with an interface to a physical network medium. In a NIC, it is common to employ random access memory (RAM) as temporary buffer storage for packets that have been received from the network or that are to be transmitted on the network. Along with the buffer RAM, the NIC contains a significant amount of complex logic for implementing the respective interfaces to the host I/O bus and the network, and to move data along respective datapaths between the I/O bus and the buffer RAM, and between the network and the buffer RAM. This complex logic is often embedded in a small number (perhaps only one) of so-called application-specific integrated circuits (ASICs). Some NICs may include a microprocessor having access to the buffer RAM through the ASIC logic, in order to provide desired functionality not readily implemented in hardware alone. Whether such a microprocessor is included or not, the ASIC logic can be viewed as a "master processor" with respect to the buffer RAM, because all transfers of data to and from the buffer RAM are controlled by the ASIC logic.

While it is necessary to provide communication between a master processor and memory, it may also be desirable in NICs or other systems to provide support for some type of co-processor. A NIC, for example, may be designed to support an optional encryption engine, which may consist of one or more integrated circuits. The encryption engine is used to encrypt outgoing packets and to decrypt incoming packets. To support such a co-processor, communication paths are needed between the co-processor and the other system elements, so that packet data can be rapidly transferred into and out of the co-processor. It can be desirable, therefore, to incorporate an interface to a co-processor in ASIC logic or a similar master processor.

It is generally known that the number of input/output pins used on an integrated circuit (IC) can affect the cost of the IC. Costs associated with testing, packaging, and decreased manufacturing yield, for example, are directly affected by the number of I/O pins on a packaged device. Additionally, ICs having a number of separate interfaces are generally more complex and difficult to design and verify than ICs having a simpler interface structures. It is generally desirable to minimize such costs and complexities. Accordingly, there is a need in the art for a co-processor interface that does not require a large number of additional pins on a master processor.

BRIEF SUMMARY OF THE INVENTION

In accordance with the present invention, a processing system is disclosed in which an optional co-processor is supported without requiring a separate interface on a master processor. High system performance is achieved, while device cost and complexity are reduced by keeping pin counts relatively low.

In the processing system, a master processor, such as a complex ASIC as discussed above, is coupled to a memory via a memory data bus. The master processor supplies an address and control signals to the memory, enabling the master processor to control the reading and writing of the memory at addressed locations. Thus data can be transferred between the master processor and the memory. Additionally, a slave processor, such as an encryption engine in one embodiment, has a data input/output bus connected directly to the memory data bus. The master processor supplies control signals to the slave processor to control the reading and writing of data to/from the slave processor via the memory data bus.

The master processor effects data transfers directly between the memory and the slave processor over the memory data bus. To transfer data from the memory to the slave processor, the master processor generates a series of memory addresses to read data from addressed locations of the memory onto the data bus. As the data word from each memory location appears on the data bus, the master processor writes the data word into the slave processor. To transfer data from the slave processor to the memory, the master processor reads a series of data from the slave processor onto the data bus, generates a series of memory addresses on the address output as the data are being read from the slave processor, and as each data word from the slave processor appears on the data bus, writes the data word into the addressed location of the memory. Thus, data flows directly between the memory and the slave processor without passing through the master processor. The only additional pins required by the master processor are the pins for the control signals to the slave processor.

Other aspects, features and advantages of the present invention will be apparent from the detailed description below.

BRIEF DESCRIPTION OF THE SEVERAL VIEWS OF THE DRAWING

The invention will be more fully understood by reference to the following Detailed Description of the Invention in conjunction with the drawing of which.

DETAILED DESCRIPTION OF THE INVENTION

Figure 1:
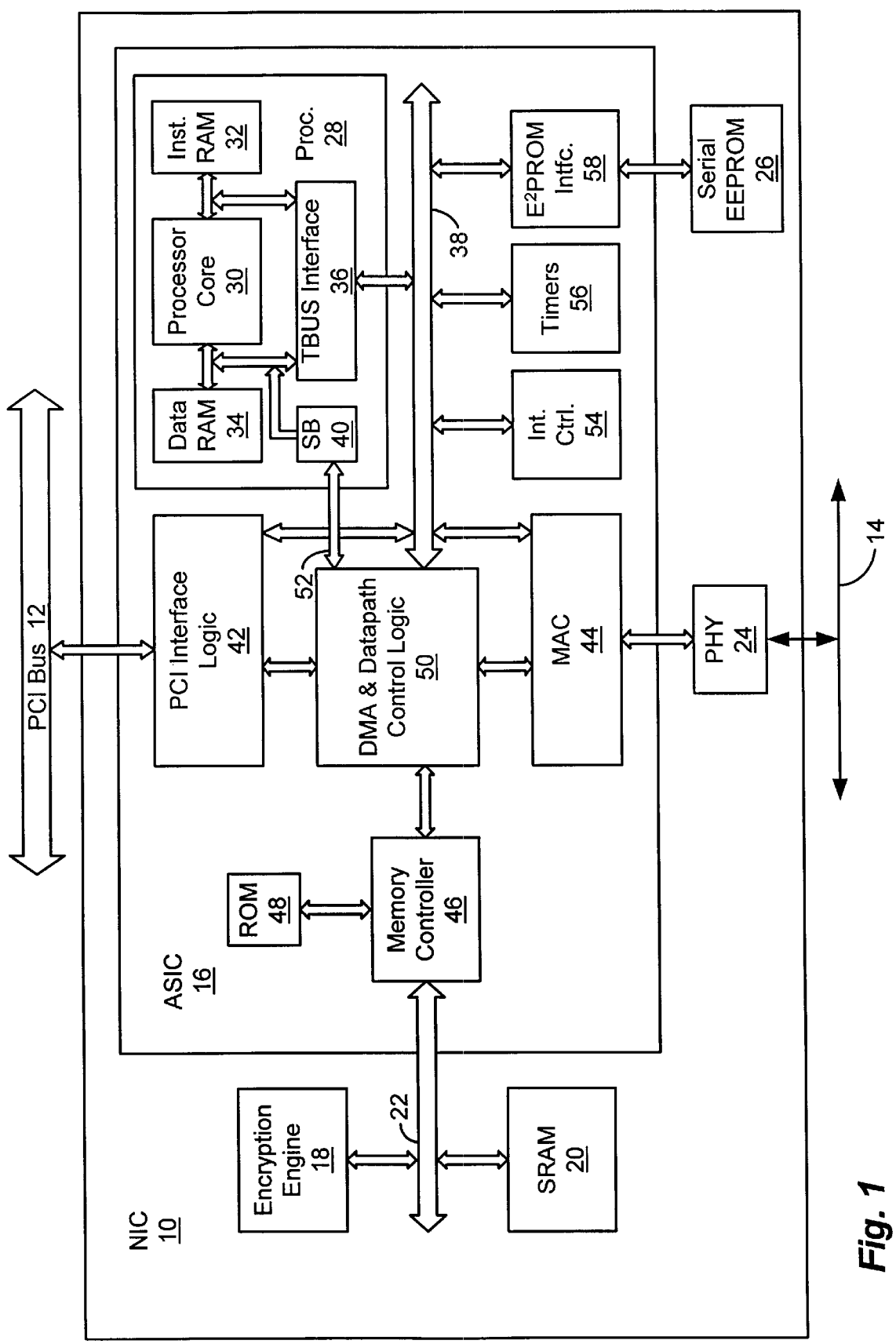
FIG. 1 is a block diagram of a network interface card (NIC) having a master processor, a slave processor, a memory, and a master-slave data bus operating according to the present invention.

FIG. 1 shows a block diagram of a network interface card (NIC) 10. As shown, the NIC 10 is intended for connection between a system I/O bus, such as a Peripheral Components Interconnect (PCI) bus 12, and an Ethernet network segment 14. The NIC 10 includes an application-specific integrated circuit (ASIC) 16 having an internal structure described below. The ASIC 16 is connected to static random access memory (SRAM) 20 by a memory bus 22. An optional encryption engine co-processor 18, which in one embodiment can be the so-called Sidewinder IC from VLSI Technology, Inc., of San Jose, Calif., can also be connected to the memory bus 22. The ASIC 16 is also connected to PHY circuitry 24 that implements a physical layer interface to the Ethernet segment 14. An electrically erasable programmable read only memory (EEPROM) 26 is also connected to the ASIC 16.

The ASIC 16 is a highly integrated processing subsystem specially tailored for network interface applications. It includes a processor 28, which in a preferred embodiment employs a processor core 30 known as the ARM9, developed by ARM, Ltd. of Cambridge, England. The processor 28 includes a 32 Kb instruction RAM 32, a 16 Kb data RAM 34, and interface logic 36 for interfacing to an internal data bus 38 referred to as the "T Bus". The processor 28 also contains a 512 byte buffer 40 referred to as a "snoop buffer" or SB, which is described below. The ASIC 16 also contains PCI interface logic 42 for interfacing to the external PCI bus 12, and media access control (MAC) logic 44 for interfacing to the external PHY logic 24. As shown, the PCI interface logic 42 and MAC logic 44 have connections to the T Bus 38. A memory controller 46 controls the SRAM 20 and the memory bus 22, and also controls access to an on-chip read only memory (ROM) 48. Direct memory access (DMA) and datapath control logic 50 provides connectivity and data movement among the PCI interface logic 42, MAC 44, memory controller 46, and T Bus 38. The DMA and datapath control logic 50 is also connected to the snoop buffer 40 by a separate bus 52. The ASIC 16 also includes interrupt control logic 54, timer logic 56, and E²PROM interface logic 58 connected to the T Bus 38. The E²PROM interface logic provides an interface to the off-chip EEPROM 26.

The T Bus 38 uses separate 32-bit unidirectional buses for data movement to and from connected elements. More specifically, three 32-bit buses carry data from the processor 28 to the PCI interface logic 42, the DMA and datapath control logic 50, and the MAC logic 44 respectively. Also, three 32-bit buses carry data to the processor 28 from respective ones of these logic blocks. The processor 28 is the only "master" on the T Bus 38, meaning that it is the only device that can initiate data transfers. The PCI interface logic 42, the DMA and datapath control logic 50, and the MAC logic 44 all interface to the T Bus 38 as slave devices, as do the interrupt control logic 54, the timer logic 56, and the E²PROM interface logic 58.

The NIC 10 of FIG. 1 operates generally to move packets between the network segment 14 and a host memory that is accessible via the PCI bus 12. All packets either transmitted or received are temporarily buffered in the SRAM 20. The host system communicates with the NIC 10 via data structures referred to as "rings" residing in host memory. Similarly, the processor 28 controls the movement of packets into and out of the SRAM 20 using rings residing in the SRAM 20. For packets being transmitted, a transmit DMA controller within the DMA and datapath logic 50 is programmed by the processor 28 to obtain a packet and an accompanying packet descriptor from a ring in host memory, and transfer the packet and descriptor to a ring in the SRAM 20. As part of this operation, the DMA controller can load the snoop buffer 40 with data that is being downloaded from the host memory to the SRAM 20. In particular, the DMA controller is programmed to load descriptors into the snoop buffer 40 as they are being transferred from the host into the SRAM 20. This feature enhances performance by enabling the processor to have fast access to descriptors.

Once these items have been transferred to the SRAM 20, the processor 28 examines the descriptor and decides what to do with the packet. Any of a variety of functions may be performed, including for example adding a Virtual Local Area Network (VLAN) tag to the packet, or performing a filtering operation so that only selected packets from the host are sent on the Ethernet segment 14.

For packets to be transmitted to the Ethernet segment 14, the processor 28 builds a new descriptor pointing to the packet data already in the SRAM 20, places the descriptor on a ring in the SRAM 20 used for outgoing packets, and programs a DMA engine within the DMA and datapath logic 50 to transfer the packet to the MAC 44. The MAC 44 transfers the packet data to the PHY circuitry 24, which transmits the packet as a series of bits on the Ethernet segment 14.

For packets received from the Ethernet segment 14, the processing is generally the reverse of that described above. The DMA and datapath logic 50 includes separate receive DMA engines that are responsible for moving packets from the MAC to the SRAM 20, and for moving packets and descriptors between the SRAM 20 and the host memory residing on the PCI bus 12. The processor 28 examines the descriptors of received packets to perform any special processing that may be required and to decide whether the packet is to be passed on to the host. For example, the processor 28 may implement some type of filtering for received packets, so that packets are selectively dropped rather than being forwarded to the host.

Figure 2:
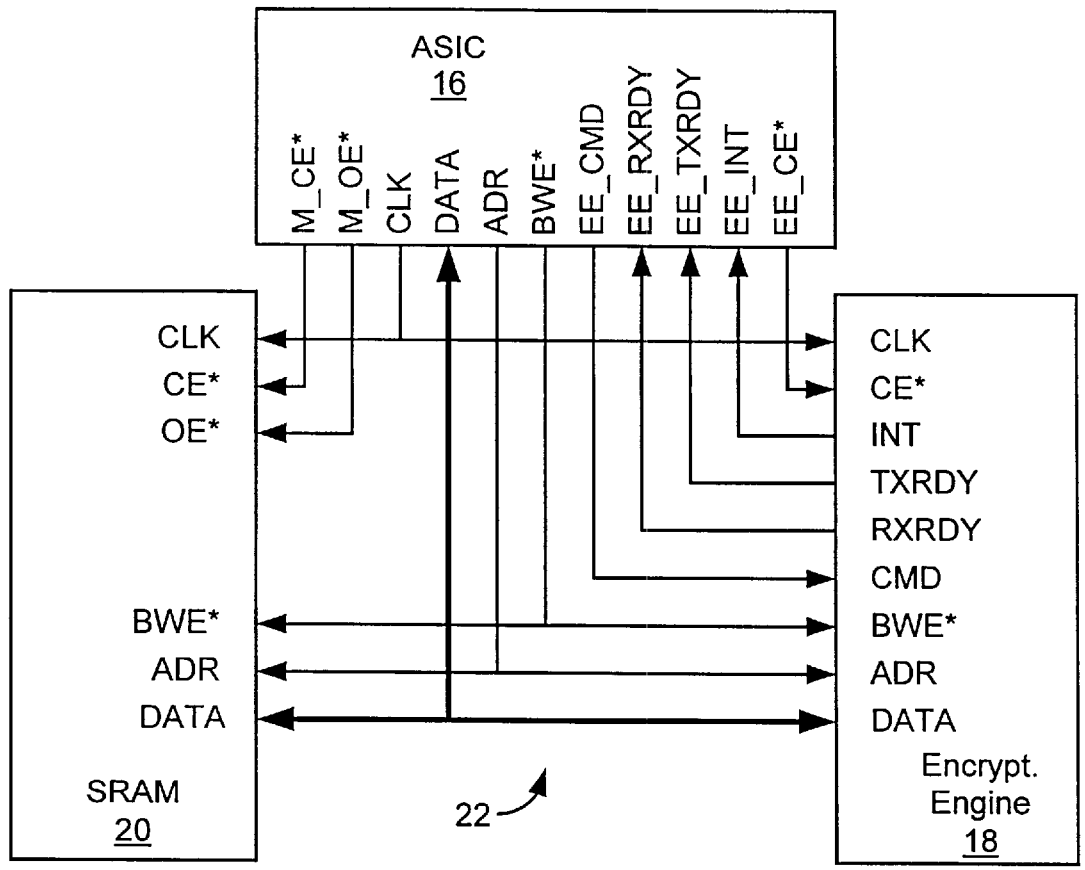
FIG. 2 is a more detailed view of the master-slave data bus of FIG. 1.

FIG. 2 shows the interconnections among the ASIC 16, the SRAM 20 and the encryption engine 18. This set of interconnections corresponds to the memory bus 22 of FIG. 1. These interconnections include the following:

| | |
|---|---|
| ADR | 17-bit memory address |
| DATA | 32-bit memory data |
| BWE* | 4-bit byte-wise write enable (active low) |
| CLK | Clock |
| M_CE* | Memory chip enable (active low) |
| M_OE* | Memory output enable (active low) |
| EE_CMD | 3-bit command for encryption engine |
| EE_RXRDY | Encryption engine Receive ready |
| EE_TXRDY | Encryption engine Transmit ready |
| EE_INT | Encryption engine interrupt |
| EE_CE* | Encryption engine chip enable (active low) |

The ASIC 16 controls data transfers to and from the encryption engine 18 using the command bus EE_CMD. Commands are encoded on this 3-bit bus as shown in the following table:

| CMD (2:0) | Description |
|---|---|
| 000 | Read from register space |
| 010 | Read from FIFO buffer |
| 011 | Read context information |
| 100 | Write to register space |
| 110 | Write from FIFO buffer |
| 111 | Write context information |

The use of the above commands during data transfers is described below.

The ASIC 16 controls all data transfers on the memory bus 22 using control signals shown in FIG. 2. The following table shows six types of transfers that can be performed:

| Transfer | SRAM | | | Encrypt. Engine | |
|---|---|---|---|---|---|
| | M_CE* | M_OE* | BWE* | EE_CE* | EE_CMD |
| ASIC → Encrypt. Engine | 1 | x | xxxx | 0 | 1xx |
| ASIC ← Encrypt. Engine | 1 | x | xxxx | 0 | 0xx |
| ASIC → SRAM | 0 | 1 | 0000* | 1 | xxx |
| ASIC ← SRAM | 0 | 0 | 1111 | 1 | xxx |
| SRAM → Encrypt. Engine | 0 | 0 | 1111 | 0 | 110 |
| SRAM ← Encrypt. Engine | 0 | 1 | 0000* | 0 | 010 |
| Idle | 1 | x | xxxx | 1 | xxx |

*Word write shown; other patterns used for ½ word and byte
'x' = Don't care

The transfers between the ASIC 16 and the encryption engine 18 are used by the ASIC 16 to read and write "registers" in the encryption engine 18. "Registers" generally include control and status registers residing in various functional components, described below, within the encryption engine 118. For register transfers, the ASIC 16 drives the address signals ADR with a value that identifies the register being accessed. For register reads to the encryption engine 18, data is returned to the ASIC 16 via the DATA lines. For writes, the data to be written into a register is transferred from the ASIC 16 to the encryption engine 18 via the DATA lines. In either case, the SRAM 20 is not involved in the data transfer.

The transfers between the ASIC 16 and the SRAM 20 are carried out by the memory controller 46 of FIG. 1 on behalf of the PCI interface logic 42, the MAC 44, or the processor 28. The ASIC 16 generates the addresses used by the SRAM 20 for these transfers, and the encryption engine 18 is not involved. These transfers can vary in size from one 32-bit word to 8 32-bit words. The processor 28 generates memory read and write requests via the T Bus 38. These requests may be for a single word (either the entire word, a ½ word or single byte of the word), or for a block of 8 words to fill a read buffer (not shown) within the T Bus interface logic 36. Transfers involving the PCI interface logic 42 employ PCI DMA engines within the DMA and datapath control logic 50. These DMA engines are programmed by the processor 28 to move packets, packet descriptors, and other data between the PCI bus 12 (via PCI interface logic 42) and the SRAM 20 (via the memory controller 56). Similarly, transfers involving the MAC 44 employ MAC DMA engines within the DMA and datapath control logic 50, which are programmed by the processor 28 to move packets between the PHY 24 (via MAC 44) and the SRAM 20.

The transfers between the encryption engine 18 and the SRAM 20 are used for two types of data. First, they are used for loading and retrieving "context" data, described below, to/from the encryption engine 18. These transfers are also used to transfer packet data to/from the encryption engine 18 for encryption or decryption. For packets to be transmitted on the network 18, unencrypted packets are supplied from the SRAM 20 to the encryption engine 18, and encrypted packets are retrieved from the encryption engine 18 and returned to the SRAM 20, for subsequent transmission. In the opposite direction, encrypted packets that have been received from the network 14 are retrieved from the SRAM 20 and supplied to the encryption engine 18. After being decrypted, the packets are returned to the SRAM 20 for ultimate delivery to the host. The ASIC 16 generates the addresses that are used for these transfers, but data is transferred directly between the encryption engine 18 and the SRAM 20 via the DATA lines; the data does not pass through the ASIC 16. Separate DMA engines within the DMA and datapath control logic 50, referred to herein as EE DMA engines, are used for these transfers. The operation of the EE DMA engines is described in more detail below.

The aforementioned "context" data includes specialized data elements that are specific to the encryption processing being performed by the encryption engine 18. Examples can include keys for Data Encryption Standard (DES) processing, hash digests for algorithms such as Message Digest 5 (MD5), etc. Context data is typically written prior to the beginning of encryption processing for a packet, and is read upon completion of the processing. Context transfers employ read and write pointers within the encryption engine 18, and thus do not require that the ASIC 16 supply an address to the encryption engine 18. Context reads and writes interact with DMA transfers in a manner described below.

Figure 3:
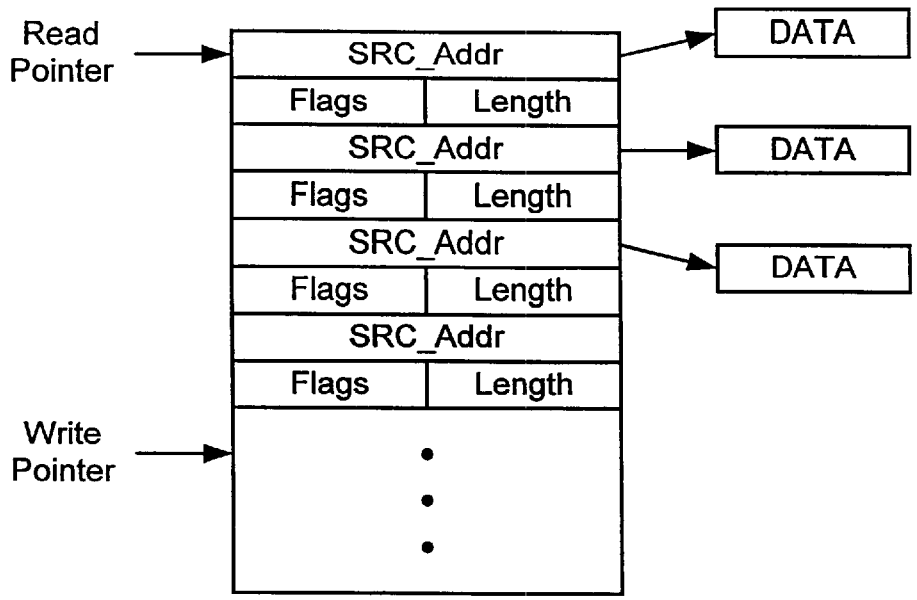
FIG. 3 is a diagram of a data structure used to control data transfers between the slave processor and the memory over the data bus of FIGS. 1 and 2.

FIG. 3 shows a data structure known as a descriptor ring, which is used by an EE DMA engine to carry out a DMA operation. There are two EE DMA engines, one to move data from the SRAM 20 to the encryption engine 18, and another to move data from the encryption engine 18 to the SRAM 20. Each EE DMA engine uses a separate descriptor ring like that shown in FIG. 3. The descriptor ring contains a logical sequence of descriptors, each one containing an address Src_Addr, a set of control/status flags Flags, and a length value Length. The address Src_Addr identifies the location in the SRAM 20 where the first word of data involved in the transfer is to be found (for SRAM reads) or placed (for SRAM writes). The length value Length identifies the size of the transfer in bytes.

A Read Pointer identifies the descriptor currently being processed by the DMA engine, and a Write Pointer identifies the location in the ring where the next new descriptor generated by the processor 28 is to be placed. Whenever the Read pointer is not equal to the Write pointer, the DMA engine transfers the descriptor information into internal working registers and carries out the transfer based on the descriptor information. Each transfer is carried out by sequentially addressing each memory location within the block identified by the starting address and length, and controlling the SRAM 20 and the encryption engine 18 to perform either a read or write, as required, for each accessed location. These transfers are described in greater detail below.

Figure 4:
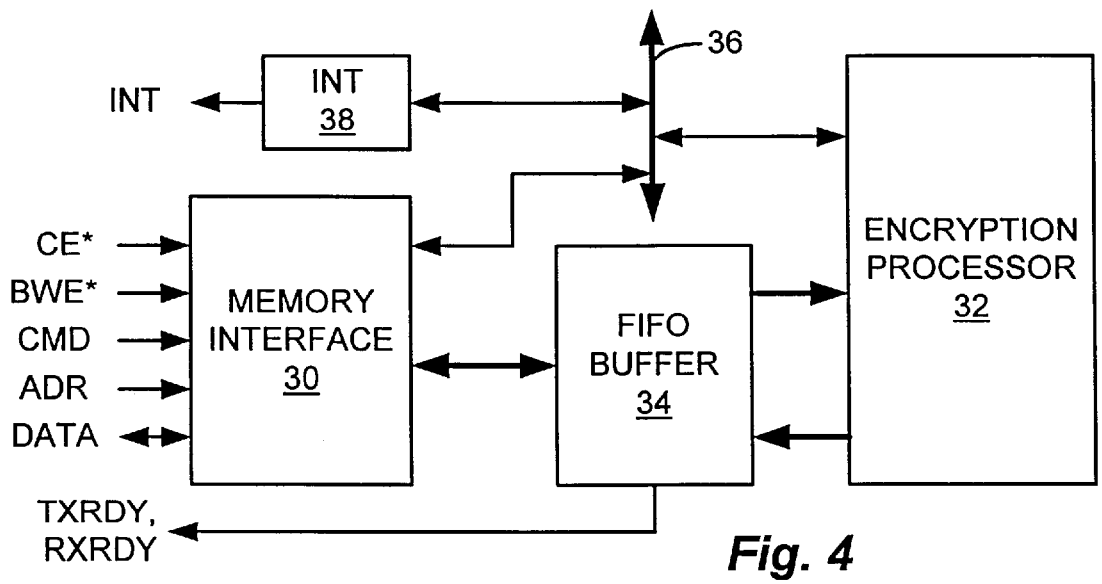
FIG. 4 is a block diagram of the slave processor of FIG. 1.

FIG. 4 shows the high-level structure of the encryption engine 18. An encryption processor 32 performs data encryption, integrity verification and authentication functions. In particular, the encryption processor 32 includes logic for encryption/decryption according to the Data Encryption Standard (DES), and for authentication using the Message Digest 5 (MD5) hash algorithm. The encryption processor 32 operates on unencrypted packets residing in a FIFO buffer 34, which in turn receives the packets from the SRAM 20 via the memory bus 22 and memory interface logic 30. The encryption processor 32 places processed packets into the FIFO buffer 34 to be transferred back to the SRAM 20 by the memory interface logic 30. A register data bus 36 provides a datapath for access to registers in interrupt logic 38, the FIFO buffer 34, and the encryption processor 32. DMA control signals TXRDY and RXRDY are generated by logic in the FIFO buffer 34. These signals are used by the ASIC 16 in a manner described below.

Figure 5:
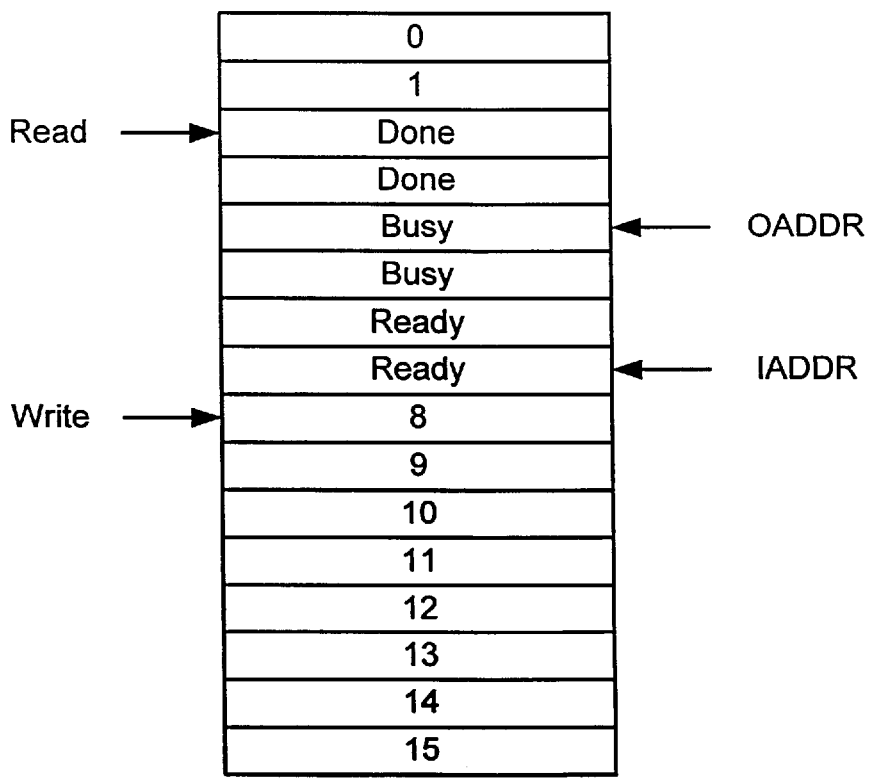
FIG. 5 is a diagram of a first-in-first-out (FIFO) data buffer in the slave processor of FIG. 4.

FIG. 5 shows the structure of the FIFO buffer 34. It contains 16 4-byte entries, numbered 0 through 15. One set of pointers, WRITE and READ, are used for writes and reads, respectively, from the memory interface logic 30. Another set of pointers, IADDR and OADDR, are used for reads and writes, respectively, by the encryption processor 32. The FIFO buffer is a circular buffer, i.e., the pointers all advance in the downward direction of FIG. 5 and wrap from entry 15 back to entry 0.

Each entry has an associated status as shown. The READY status indicates that a word has been written by the memory interface logic 30 and is ready for processing by the encryption processor 32. The BUSY status indicates that the word is being processed by the encryption processor 32. The DONE status indicates that processing of the word has been completed, and may be returned to the SRAM 20. As shown, the entries between the WRITE pointer and the IADDR pointer are READY; the entries between the IADDR pointer and the OADDR pointer are BUSY; and the entries between the OADDR pointer and the READ pointer are DONE.

The encryption processor 32 performs in-place processing of entries in the FIFO buffer 34. When the processing for an entry is complete, the processed entry is returned to the same location in the FIFO buffer 34. The use of the separate pointers OADDR and IADDR allows for variable processing time by the encryption processor 32. Also, the encryption processor 32 operates on multiple entries simultaneously in a pipelined fashion, enhancing performance.

As previously mentioned, the signals TXRDY and RXRDY are DMA control signals used to control data flow during transfers between the SRAM 20 and the encryption engine 18. There are four sets of rules for these signals as follows:

1. Generally, the encryption engine 18 asserts RXRDY high whenever there are at least 8 word locations (32 bytes) available in the FIFO buffer 34, and otherwise de-asserts RXRDY. An exception to this rule is that the encryption engine 18 de-asserts RXRDY when the last 8 or fewer words of a packet have begun to be transferred to the encryption engine, and maintains RXRDY de-asserted until context information is read by the ASIC 16.
2. Generally, the ASIC 16 must sample RXRDY prior to beginning a DMA transfer from the SRAM 20 to the encryption engine 18. When RXRDY is asserted, the ASIC 16 transfers 8 words from the SRAM 20 into the FIFO buffer 34, unless the data is from the end of a packet, in which case only the remaining words from the packet are transferred. It is possible for the ASIC 16 to break up an 8-word transfer into multiple DMA accesses. If this is done, the ASIC 16 only samples RXRDY again after the 8-word transfer is complete, in order to determine whether to start another 8-word transfer.
3. Generally, the encryption engine 18 asserts TXRDY whenever there are at least 8 words (32 bytes) of DONE entries in the FIFO buffer 34. An exception to this rule is that the encryption engine 18 asserts TXRDY when the last 8 or fewer words of a packet are DONE. In this case TXRDY is asserted until the first word of the last transfer is read, when TXRDY is de-asserted. TXRDY remains de-asserted until context information is valid within the encryption engine 18, at which time TXRDY is re-asserted. TXRDY is then de-asserted again when the first word of context information is read by the ASIC 16.
4. Generally, the ASIC 16 must sample TXRDY prior to beginning a DMA transfer from the encryption engine 18 to the SRAM 20. When TXRDY is asserted, the ASIC 16 transfers 8 words from the FIFO buffer 34 to the SRAM 20, unless the data is from the end of a packet, in which case only the remaining words from the packet are transferred. It is possible for the ASIC 16 to break up an 8-word transfer into multiple DMA accesses. If this is done, the ASIC 16 only samples TXRDY again after the 8-word transfer is complete, in order to determine whether to start another 8-word transfer.

Figure 6:
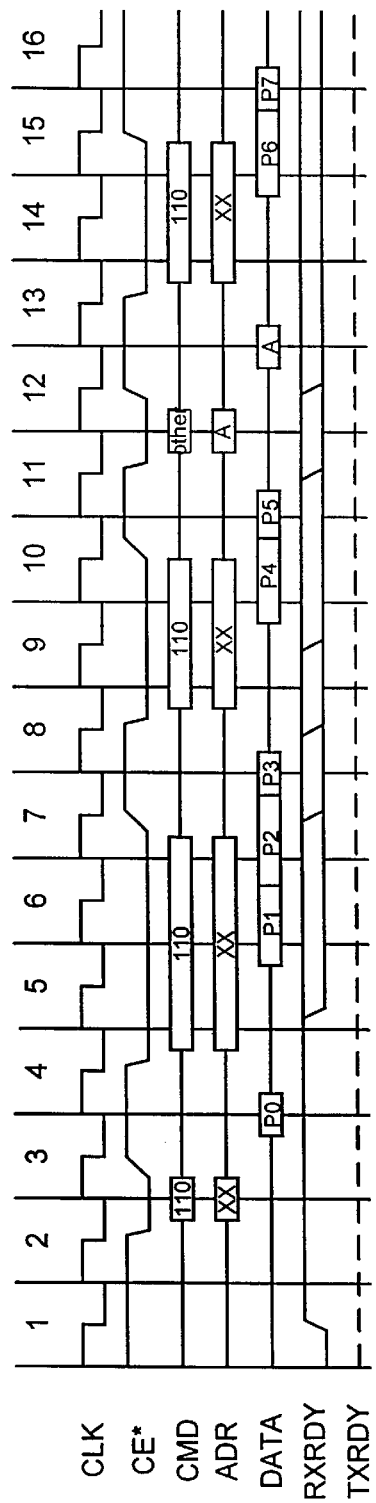
FIG. 6 is a timing diagram illustrating a data transfer from the memory to the slave processor over the data bus of FIGS. 1 and 2.

FIG. 6 shows the timing of packet data transfers from the SRAM 20 to the encryption engine 18. The transfer begins when RXRDY is sampled high in cycle 2. The first word P0 of an 8-word transfer is written at the end of cycle 3, and the last word is written at the end of cycle 15. As shown, the RXRDY signal may become de-asserted in response to any of the writes. However, there is guaranteed to be room for all 8 words in the FIFO buffer 34. The ASIC 16 ignores RXRDY throughout the transfer once the transfer has begun, and only samples RXRDY again just prior to beginning a subsequent transfer from the SRAM 20 to the encryption engine 18.

FIG. 6 also shows that a register write (indicated as a command of "other") occurs during cycles 11–13. This sequence illustrates that register transfers can be performed during an 8-word transfer without adverse consequences. This capability provides for more flexible operation of the ASIC 16 and encryption engine 18.

Figure 7:
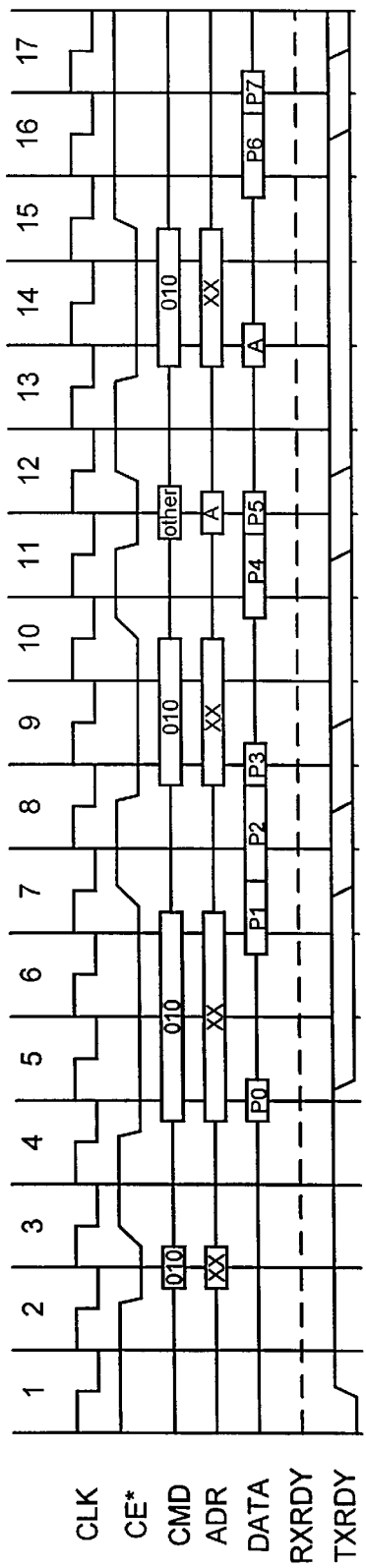
FIG. 7 is a timing diagram illustrating a data transfer from the slave processor to the memory over the data bus of FIGS. 1 and 2.

FIG. 7 shows the timing of a packet data transfer from the encryption engine 18 to the SRAM 20. TXRDY must be sampled high to initiate an 8-word read, and then is ignored throughout the remainder of the 8-word transfer. Register reads can be performed in the middle of the sequence as shown at cycles 11–13.

A method for performing slave-to-slave transfers over a master-slave bus has been described. It will be apparent to those skilled in the art that modifications to and variations of the above-described technique are possible without departing from the inventive concepts disclosed herein. Accordingly, the invention should be viewed as limited solely by the scope and spirit of the appended claims.

What is claimed is:
1. Apparatus, comprising:
a memory having an address input, a data input/output, and control inputs by which reading and writing of the memory at an address appearing on the address input are controlled;
a slave processor having a data input/output and control inputs by which reading and writing of data in the slave processor are controlled, the slave processor data input/output being coupled to the data input/output of the memory by a data bus; and
a master processor having an address output coupled to the address input of the memory, memory control outputs coupled to respective ones of the control inputs of the memory, and slave processor control outputs coupled to respective ones of the control inputs of the slave processor, the master processor being operative to effect a data transfer from the memory to the slave processor by (i) generating a series of memory addresses on the address output, (ii) reading data from the addressed locations of the memory onto the data bus, and (ii) as the data word from each memory location appears on the data bus, writing the data word into the slave processor, the master processor being further operative to effect a data transfer from the slave processor to the memory by (iii) reading a series of data from the slave processor onto the data bus, (iv) generating a series of memory addresses on the address output as the data are being read from the slave processor, and (v) as each data word from the slave processor appears on the data bus, writing the data word into the addressed location of the memory.

2. Apparatus according to claim 1, wherein the slave processor includes a data buffer coupled to the data bus, the data buffer being operative to receive the data from the data bus during the transfer from the memory to the slave processor and to provide the data to the data bus during the transfer from the slave processor to the memory.

3. Apparatus according to claim 2, wherein the slave processor includes processing logic coupled to the data buffer to receive input data therefrom and provide processed data thereto.

4. Apparatus according to claim 3, wherein the data buffer is a first-in-first-out (FIFO) data buffer operative to provide data to the processing logic in the order received from the memory and to provide data to the memory in the order received from the processing logic.

5. Apparatus according to claim 2, wherein the slave processor further includes a read pointer and a write pointer, the read pointer being operative during the data transfer from the slave processor to the memory to identify a series of locations in the data buffer from which the data being transferred is obtained, and the write pointer being operative during the data transfer from the memory to the slave processor to identify a series of locations in the data buffer into which the data being transferred is stored.

6. Apparatus according to claim 1, wherein (i) the slave processor includes a first flow-control output via which the slave processor signals its ability to accept data from the data bus, (ii) the slave processor includes a second flow-control output via which the slave processor signals its ability to provide data to the data bus, (iii) the master processor includes a first flow-control input coupled to the first flow-control output of the slave processor and is operative to effect the transfer of data from the memory to the slave processor only when the slave processor is able to accept the data as indicated by the first flow-control output, and (iv) the master processor includes a second flow-control input coupled to the second flow-control output of the slave processor and is operative to effect the transfer of data from the slave processor to the memory only when the slave processor is able to provide the data as indicated by the second flow-control output.

7. Apparatus according to claim 6, wherein (i) the slave processor includes a data buffer coupled to the data bus, the data buffer being operative to receive data from the data bus during the transfer from the memory to the slave processor and to provide the data to the data bus during the transfer from the slave processor to the memory, (ii) the slave processor signals its ability to accept data when there are sufficient empty locations in the data buffer to accept the data involved in the transfer from the memory, and (iii) the slave processor signals its ability to provide data when there are sufficient data in the data buffer to provide the data involved in the transfer to the memory.

8. Apparatus according to claim 1, wherein the master processor includes a first DMA engine operative to effect the transfer from the memory to the slave processor, and a second DMA engine operative to effect the transfer from the slave processor to the memory.

9. Apparatus according to claim 8, wherein the first DMA engine is operative to effect the transfer from the memory to the slave processor in accordance with a first DMA descriptor ring stored in the memory, and wherein the second DMA engine is operative to effect the transfer from the slave processor to the memory in accordance with a second DMA descriptor ring stored in the memory.

10. Apparatus according to claim 1, wherein the master processor includes a first interface to a host system and a second interface to a network and is operative to transfer packets between the host system and the network using the memory as a packet buffer, the slave processor is an encryption engine operative to perform encryption processing on packets stored in the packet memory, the data transferred from the memory to the encryption engine is packet data to be processed by the encryption engine, and the data transferred from the encryption engine to the memory is data resulting from the processing of the packet data by the encryption engine.

11. Apparatus according to claim 1, wherein the slave processor includes an address input coupled to the address output of the master processor, the slave processor being operative to identify, from an address appearing on the address input, a location therein to be read from during a slave processor read transaction and written to during a slave processor write transaction, and wherein the master processor contains a data input/output coupled to the data bus, the master processor being operative during a slave processor read transaction to generate a slave processor address on its address output and to transfer data from the slave processor to the master processor over the data bus, the master processor being operative during a slave processor write transaction to generate a slave processor address on its address output and to transfer data from the master processor to the slave processor over the data bus.

12. Apparatus according to claim 11, wherein the location being read from during a slave processor read transaction and written to during a slave processor write transaction is a register mapped into a register region of the address space of the master processor.

13. A method for controlling data exchange between a slave memory and a slave processor, comprising:

writing at least one address over an address bus from a master processor to the slave memory;

in response to a control input provided to the slave processor and the slave memory by the master processor:

in a first mode, transmitting data contained within the slave memory at the at least one address over a first data bus to the slave processor; and in a second mode, transmitting data from the slave processor over a second data bus for storage within the slave memory at the at least one address.

14. A method according to claim 13, wherein the first and second data buses comprise a single bidirectional data bus.

* * * * *